United States Patent [19]
Albrecht et al.

[11] Patent Number: 5,281,822
[45] Date of Patent: Jan. 25, 1994

[54] ADVANCED NEUTRON DETECTOR

[75] Inventors: Peter Albrecht, Manhattan Beach; Stanley Schneider, Rancho Palos Verdes, both of Calif.

[73] Assignee: McDonnell Douglas Corporation, Long Beach, Calif.

[21] Appl. No.: 550,949

[22] Filed: Jul. 11, 1990

[51] Int. Cl.$^5$ .............................................. G01T 1/24
[52] U.S. Cl. .......................... 250/370.05; 250/370.14
[58] Field of Search ................. 250/370.05, 390.01, 250/392, 370.14; 357/30; 376/153, 158

[56] References Cited
U.S. PATENT DOCUMENTS

| | | | |
|---|---|---|---|
| 2,988,639 | 6/1961 | Welker et al. | 250/370.05 |
| 4,163,240 | 7/1979 | Swinehart et al. | 250/370.05 |
| 4,891,522 | 1/1990 | Coon et al. | 250/370.14 |

OTHER PUBLICATIONS

Dearnaley et al, "Semiconductor Fast Neutron Detectors", I.R.E. Trans. Nucl. Sci, NS-9 (3), Jun. 1962, pp. 174-180.

Primary Examiner—David C. Cain
Attorney, Agent, or Firm—Donald E. Stout; John P. Scholl

[57] ABSTRACT

A neutron detector for use in high energy flux environments. Multiple stacked arrays of biased Si PIN diodes are provided with adjustable lower and upper energy detection thresholds. Shielding along the sides and back of the detector limits the sensing to along the forward line of sight of the detector, and a short time gate limits sensing of an individual cell to a single event.

8 Claims, 6 Drawing Sheets

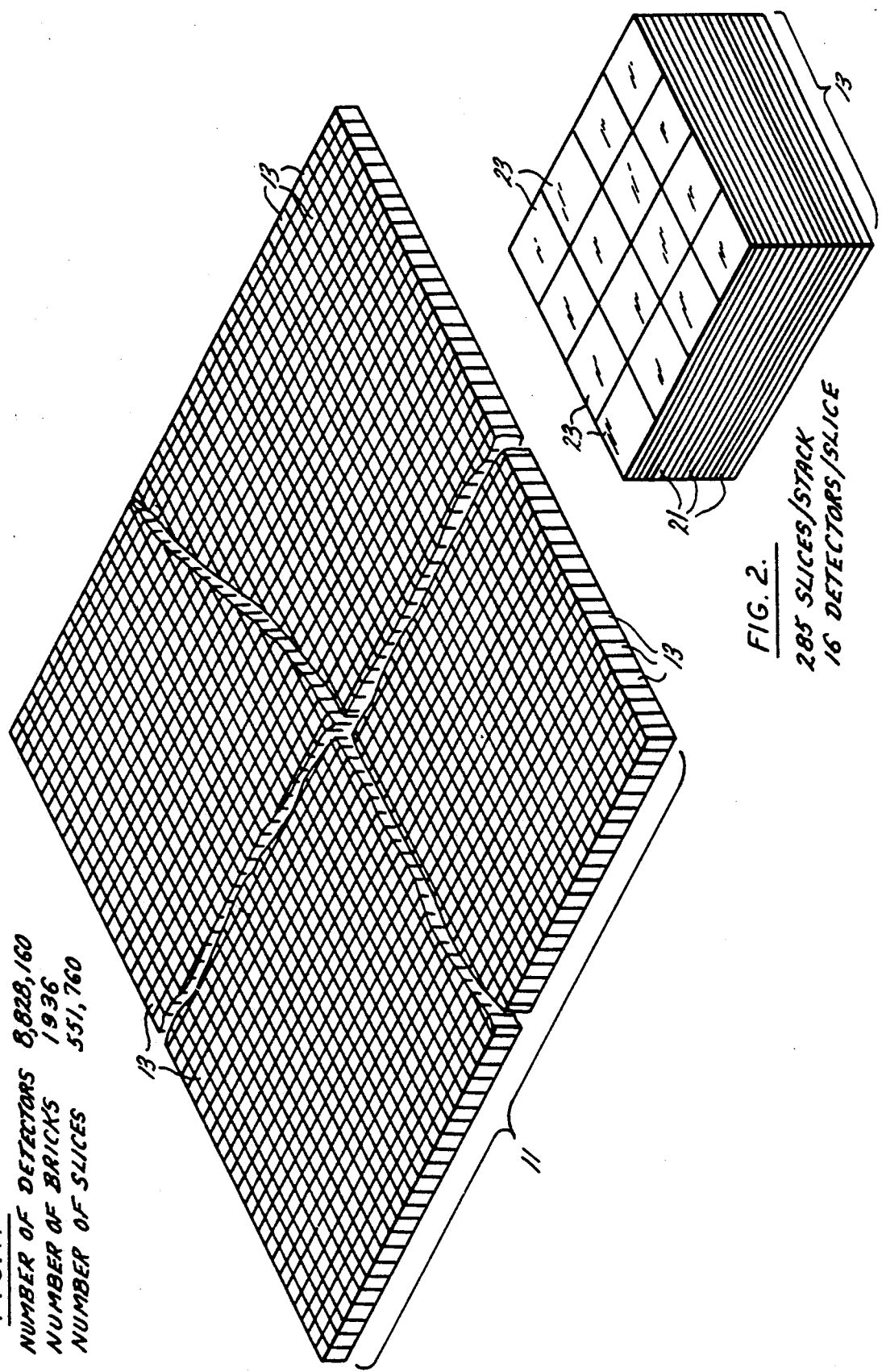
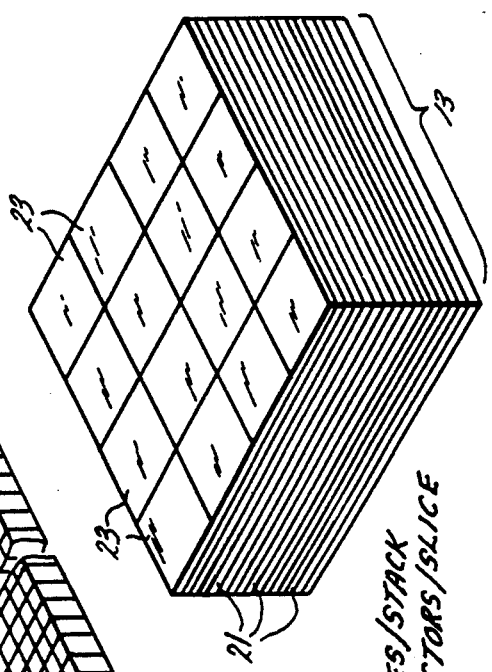
FIG. 1.
NUMBER OF DETECTORS 8,828,160
NUMBER OF BRICKS 1936
NUMBER OF SLICES 551,760
FIG. 2.
285 SLICES/STACK
16 DETECTORS/SLICE

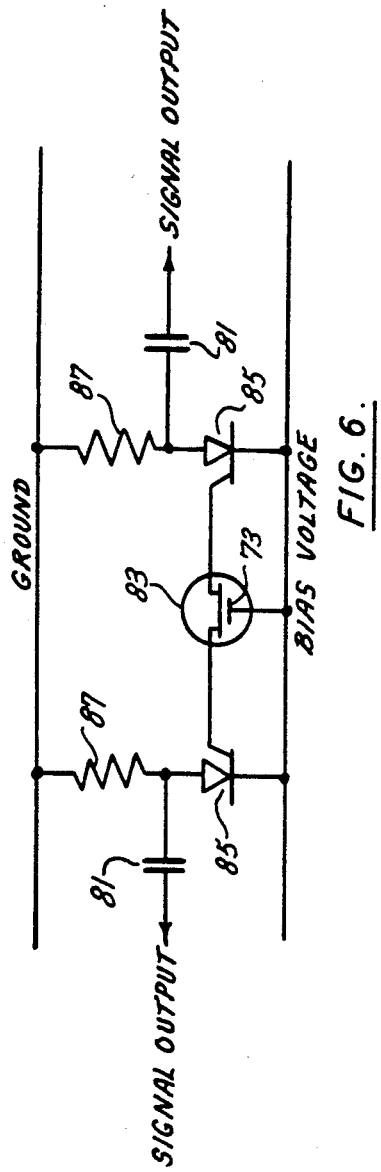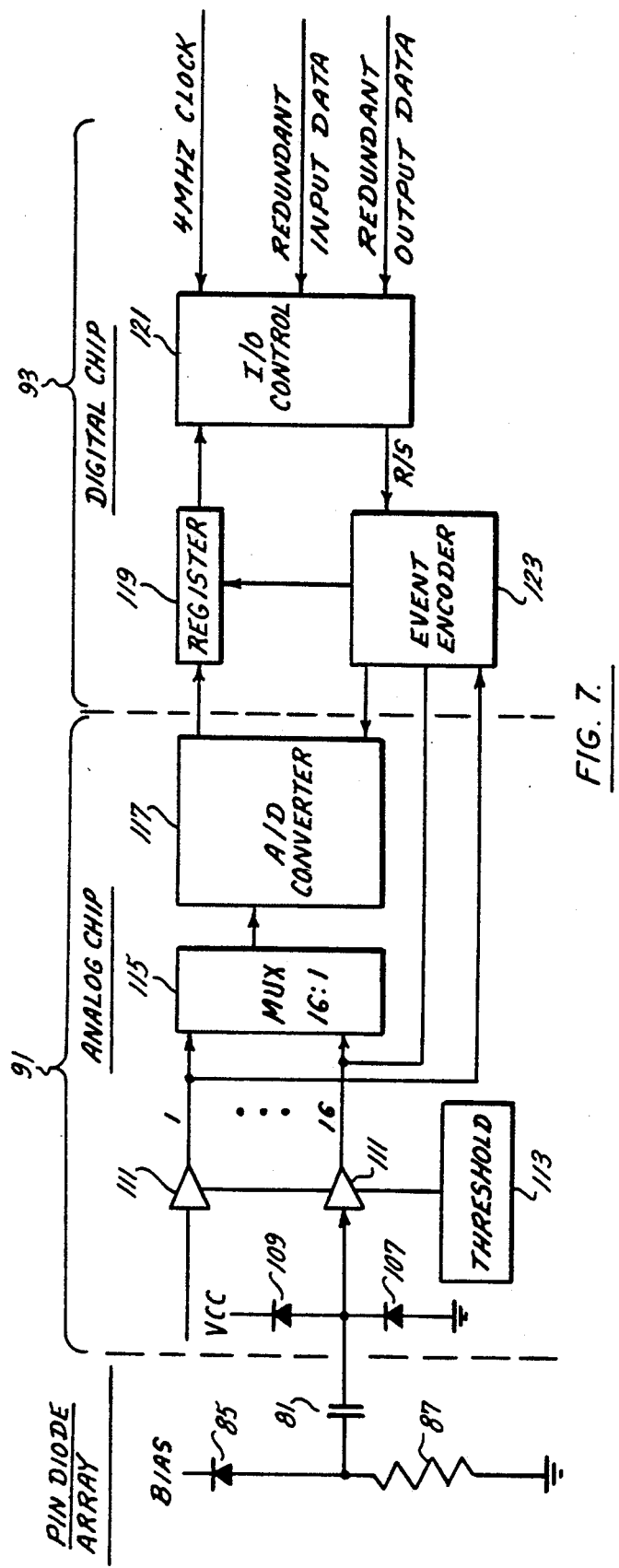

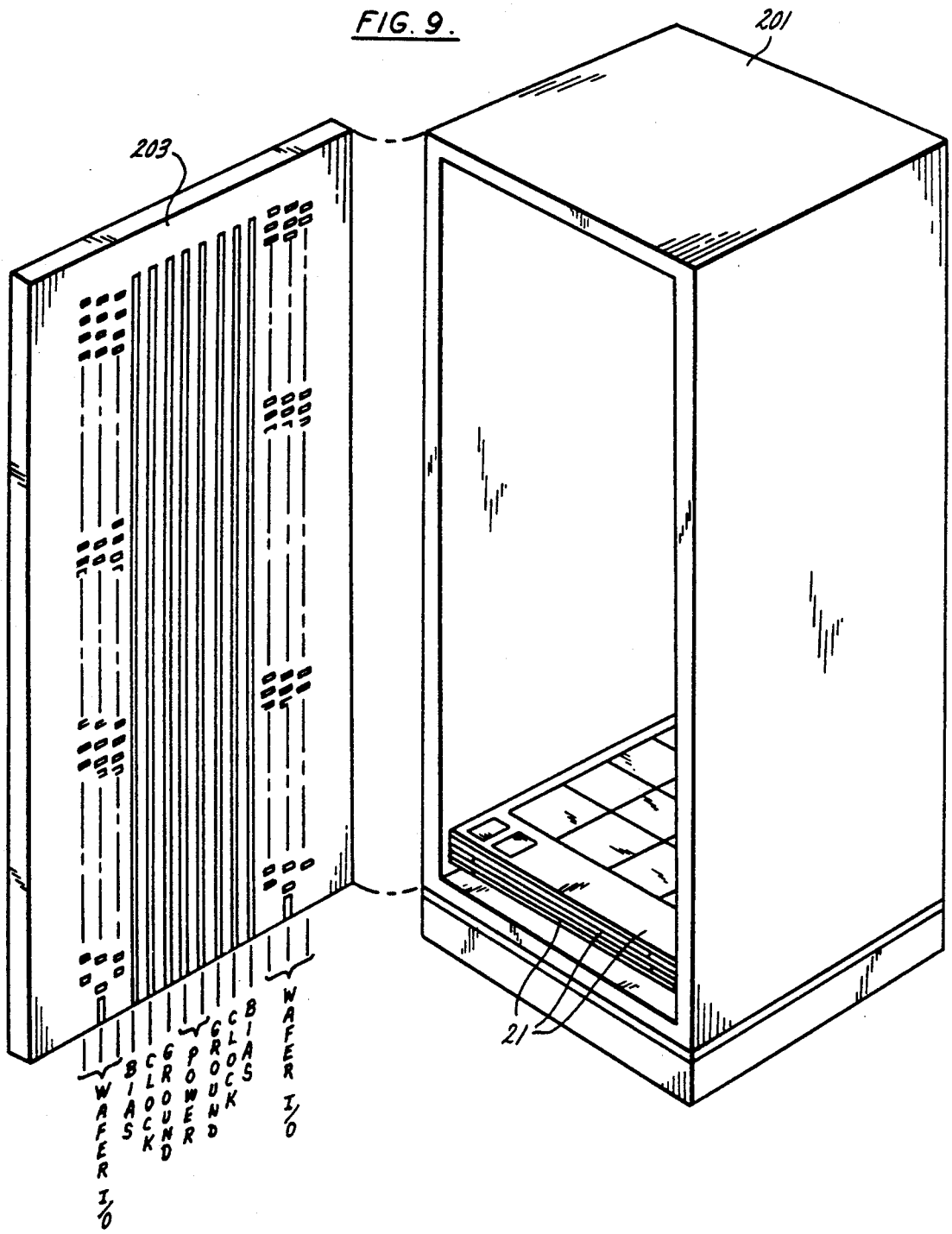

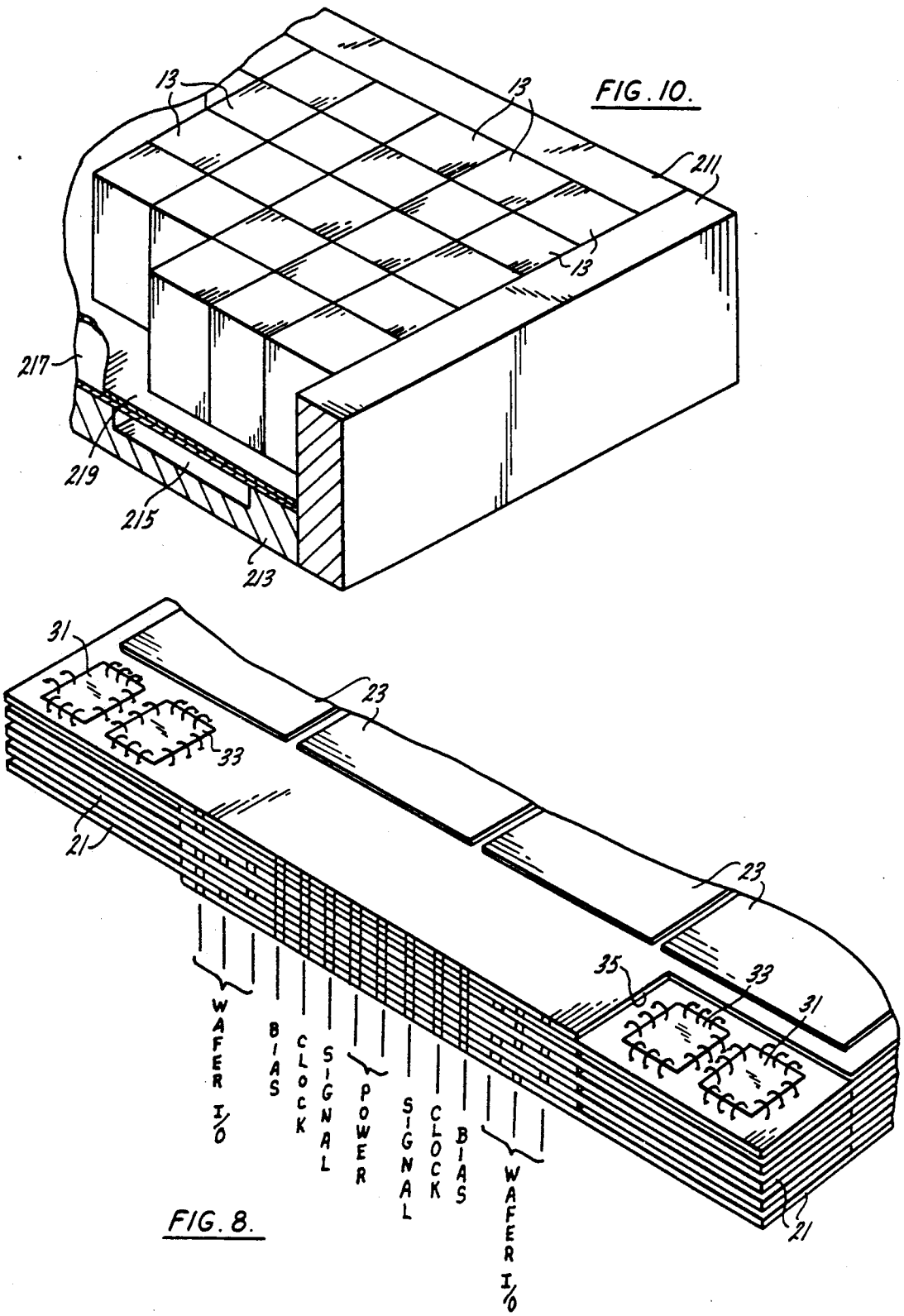

ADVANCED NEUTRON DETECTOR

BACKGROUND OF THE INVENTION

The Neutral Particle Beam system is a key component in the Strategic Defense Initiative defense scenario. It can discriminate between reentry vehicles containing warheads and high-replica decoys and other penetration aids in the midcourse flight regime. This ability to discriminate and kill these assets derives from the interactions between the neutral particle beam and the target materials, and from the detailed nature and quantity of the induced emissions generated by the interactions.

One such emission attractive for potential use is the neutron. A major problem in realizing the necessary discrimination capability involves neutron detection in a high background radiation environment, particularly in the case of a nuclear burst. No such detector has heretofore been available.

The advanced neutron detector of the present invention is capable of operating in the hostile exoatmospheric environment which includes albedo neutrons, gamma rays, and cosmic rays. The operating environment is made even more hostile by the presence of inadvertent and/or advertent nuclear bursts. Of particular concern are the late-time neutron and gamma rays due to nuclear bursts.

Consequently, a detector is needed which will enable execution of midcourse discrimination by the leading candidate observable, the neutral particle beam induced neutron yield as a measure of the mass of the body being probed. For such a detector to be useful, it must be high in efficiency, low in weight, and modest in cost. These objectives require a breakthrough in the neutron detector technology.

In a hostile space environment, especially during nuclear engagement, the background can be filled with high energy particles. The nuclear burst produced background neutron environment the detector sees could be a very large factor, typically 10 larger than the neutron signal produced by neutral particle beam interaction with the body being probed at ranges of interest. Therefore, a good detector must be able to discriminate targets within this hostile scenario. Furthermore, the required neutron detector must be highly efficient so that the detector weight and costs are affordable.

SUMMARY OF THE INVENTION

The detector of the present invention provides neutron detection which has the ability to characterize the energy distribution of particles received from a general direction. This provides for the ability to count neutrons above a given energy in the presence of a much larger background of lower energy neutrons and gamma rays.

A major feature of the neutral particle beam for potential high-fidelity discrimination between reentry vehicle, high-replica and lightweight decoys is the production of neutrons and gamma rays upon illumination by a neutral particle beam. These particles are usually generated in a quasi-linear manner proportional to the target mass traversed by the beam, provided the beam energy is high enough not to be significantly decreased by the target mass thickness.

The detector of the present invention can operate in the natural background environment which contains atmosphere albedo and cosmic-ray interaction in both the surrounding areas and within the detector itself. The detector of the present invention also has low weight and can be constructed in a manner minimizing fabrication complexity, which in turn will lower the cost.

The same silicon material serves a dual function in the detector. First, it serves as the base material with which the neutrons interact to produce the charged particle via nuclei transmutation. Secondly the silicon material is used to form the semiconductor in the measurement circuit. This dual use feature acts to lower the weight, fabrication density and the cost. The detector is especially useful in generating a complete data base for neutral particle beam space project.

BRIEF DESCRIPTION OF THE DRAWINGS

The structure and method of operation of the invention, together with additional advantages thereof, will be best understood from the following description of specific embodiments when read in connection with the accompanying drawings, in which:

FIG. 1 illustrates a macroscopic view of the spatial layout of the detector of the present invention;

FIG. 2 illustrates a three dimensional view of one of the bricks or rectangular stack of slices within the detector of FIG. 1;

FIG. 6 is an electrical circuit schematic representation of the circuits formed by the monolithic detector of FIG. 5;

FIG. 7 is a block diagram illustrating cooperation between the pin diode array forming the monolithic detector, and the analog and digital electronics mounted upon the slice of FIGS. 3 and 4;

FIG. 8 is an perspective end view of a stack of the slices of FIGS. 3 and 4 illustrating the alternate left and right hand location of the on slice chip with spacing notch, as well as the alignment of the slice utility and input/output connection locations;

FIG. 9 illustrates an isometric view of a rectangular box carrier used to support and provide utility and input/output connections to the stacked slices illustrated in FIG. 8;

FIG. 10 illustrates the organization of the box carriers of FIG. 9 within a tray to permit the spatial layout of the detector area as illustrated in FIG. 1.

DETAILED DESCRIPTION OF THE PREFERRED EMBODIMENT

Figure 5:
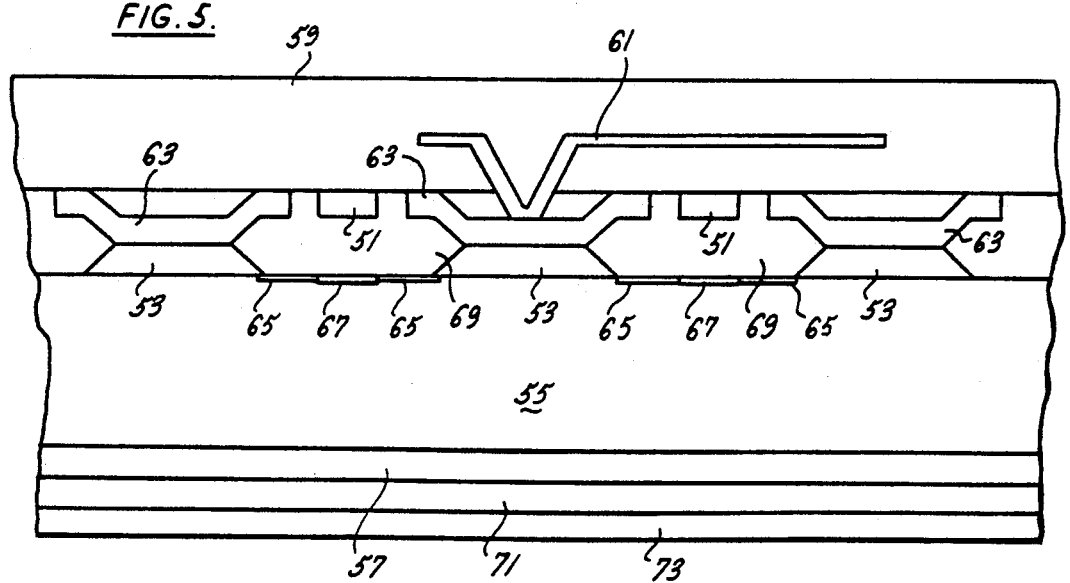
FIG. 5 is a sectional view of the monolithic detector illustrating the structural orientation of the areas of doped silicon forming the circuit components of the detector.

The detector of the present invention will be dealt with from a dimensionally macroscopic view beginning with FIG. 1, and proceed to a microscopic view at FIG. 5. A circuit schematic at FIG. 6, and system schematic at FIG. 7 will follow. Equations will introduce physical data upon which the system is based. The description, beginning with FIG. 8, will include the details of implimentation into a functional macroscopic device.

The operational configuration of the detector array 11 of the present invention is shown in FIG. 1. Generally, the detector array 11 is sheet or tray shaped. It is best "aimed" at the area to be detected by alligning the upper surface normally with respect thereto. Although this is the optimum orentation, slight misalignment will cause an error related more to the diminution of cross sectional illumination than to one of orientation toward an area not the source of neutrons.

Due to the graphic difficulty in illustrating 88×88 divisions in the array 11, a pair of orthogonal separation sections crosses the detector to indicate the visual absence of additional divisions necessary to complete the 88×88 structure. A brick 13 comprises a basic vertical unit of the detector array, and the small divisions in array 11 indicate the presence of the bricks 13.

As is illustrated near the FIG. 1 heading, between the heading and the actual figure, the array 11 is made up of 88×88=1936 bricks 13. Referring to FIG. 2, each brick 13 of FIG. 1 is made up of a number of thin horizontally extending slices 21. Each slice 21 is subdivided into a 4×4 matrix forming sixteen areas, each area representing a detector 23. Referring back to FIG. 1, the array 21 contains 1936 bricks each having 285 slices per brick which equals a total of 8,828,160 individual detectors.

Figure 3:
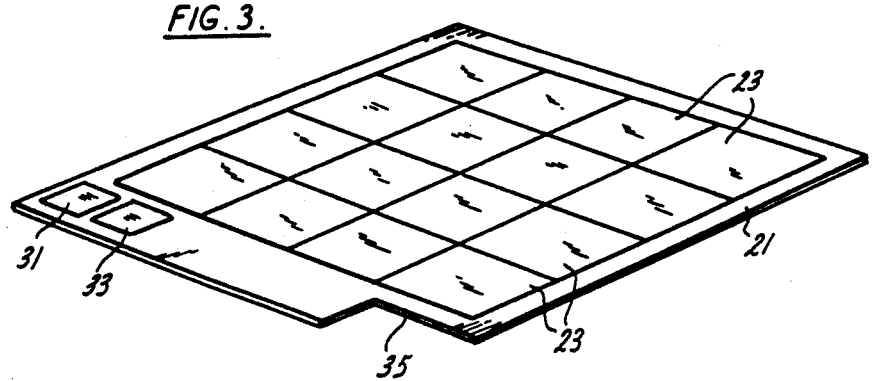
FIG. 3 illustrates the layout of a single slice of the expanded cell illustrated in FIG. 2.

Referring to FIG. 3, a perspective illustration of a single slice 21 as was shown in FIG. 2 is shown in an expanded view. The individual detectors 23 occupy the bulk of the area on slice 21. At the left frontward portion of slice 21 are circuit areas 31 and 33. These areas have been set aside for on-slice location of the analog/digital circuitry which will serve the detectors 23, and as will be explained in greater detail below. At one corner of slice 31, a notch 35 is provided. Notch 35 is for the purpose of providing additional volume for the circuits located on circuit areas 31 and 33 of other slices 21 which will be located above and below slice 21.

Figure 4:
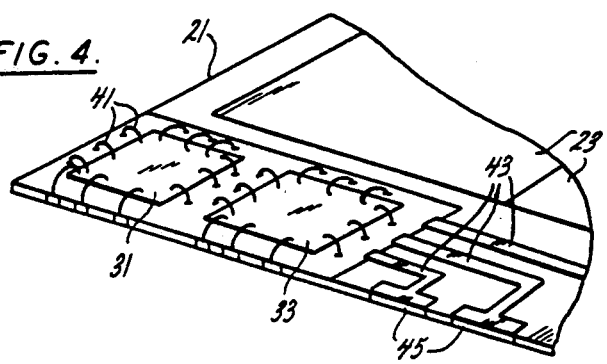
FIG. 4 is an expanded view of one edge of the single slice of FIG. 3 illustrating the electronics mounting area.

Referring t FIG. 4, a closeup of the circuit areas 31 and 33 of FIG. 3 are illustrated. The physical representation of the circuit elements are not illustrated, but typically the circuit connections will be made by wire bond 41, as is shown connecting circuit area 31. Illustrated are three examples of surface metallization 43 which terminate in edge metallization 45. In this manner, the circuits within circuit areas 31 and 33 are connected via wire bond 41, surface metallization 43 and edge metallizations 45 to a point off the slice 21.

The detector 23 structure of FIGS. 1-4 as per the above description, is largely composed of silicon. Most of the silicon is used for collecting neutrons. The silicon serves two purposes. Firstly, the silicon is an interaction medium to convert the neutrons to charged particles including the protons and alphas. Secondly, the semiconductor detector medium allows for the counting of secondary charge and hence, neutron energy determination.

The neutron detector of the present invention is implemented using silicon wafers as both the detection medium which acts to convert the neutrons to charged particles and the low-energy neutron filter. To obtain high detection efficiency the maximum silicon wafer volume is devoted to capturing the ionization resulting from a high-energy neutron interaction. Generally, the detector design consists of a PIN-diode array constructed within a high-purity silicon wafer. The intrinsic layer of the diode occupies most of the thickness of the wafer. The n, or negatively doped side of the diode is a thin layer on the backside of the wafer, while the p, or positively doped side is segmented into 16 charge collection areas on the front side of the wafer. Charges generated by ionization in the intrinsic layer are quickly collected due to the electric field applied between the front and back of the wafer, and as shall be discussed in the theory of operation section.

As shown in FIGS. 1-4 the detector of the present invention combines in an integral wafer a large-area, detector 23 made of a high-voltage PIN diode, and moderate speed digital circuitry as in areas 31 and 33, all of which consume minimum power. All of these elements exist as separate functions working together in a single wafer.

The cross section PIN diode array is illustrated in FIG. 5. Isolation of each diode in the array is by means of field plates 51 which prevents leakage currents flowing from one diode section to another. The silicon layers 53, 55 and 57 form the PIN diodes. In the event that one PIN diode becomes shorted due to a defect in the high purity silicon layer 55, it will fuse open. Without the field plate 51, the leakage current from the shorted diode would be diverted to adjacent diodes. However, with the field plates 51, no conduction to adjacent diodes takes place. The advantage of this design is that wafers with less than 100% of the PIN diodes operating is acceptable and there is no power consumption penalty.

Referring to FIG. 5, a cross section of the silcon layers comprising the detectors 23 of FIGS. 1, 2, 3 and 4 is shown. At the top of FIG. 5 a top layer 59 of silicon dioxide acts as a passivation layer to protect the thin silicon structures underneath from contamination. Within top layer 59 a signal line 61 extends, acting as a signal carrier, to the analog circuitry. Also, beneath top layer 59 a located a cup-shaped polysilicon layer 63. Polysilicon cup shaped 63 layer is situated above a p+type silicon layer 53 and acts as a contact point to layer 53. Layer 53 is the cathode of a PIN diode. Adjacent sets of p type silicon layers 53 are separated by a pair of lengths of n type silicon 65. Structures 63, 53 and 51 are isolated from the adjacent structures 63 and 53 by a layer of silicon dioxide dielectric 69. Elements 65, 67, 51 and 69 are necessary in providing isolation between layers 53.

A strip of polysilicon 51 which forms the field plate separates adjacently located polysilicon layers 63. The polysilicon layer 63, p +type silicon layer 53, n type silicon 65, n + +strip 67 and polysilicon strip 51 are all deposited on the intrinsic layer of high purity silicon 55. Beneath the volume of high purity silicon 55 is a layer of n type silicon 57, which forms the ANODE of the PIN diode, a layer of n+polysilicon, 71, for contacting 57 to a layer 73 of aluminum metallization.

The entire thickness of the layers of FIG. 5 is about 500 microns and the high purity silicon layer 55 thickness is approximately 495 microns.

Referring to FIG. 6, the schematic of the detector 23 is shown. High voltage coupling capacitors 81 provide PIN diode leakage current isolation. The ionizing dose from a high altitude nuclear burst results in the application of the bias voltages, 200 to 400 V, across the coupling capacitors 81. By implementing these capacitors on the slice 21 of the earlier FIGS., sufficient dielectric can be provided to withstand the voltage. High voltages can also be imposed on the capacitor by a too rapid application of the bias voltage.

The power required to bias the PIN diodes is a significant portion of the total power budget required to operate the detector array. The power consumption of the PIN diodes is due to the leakage current which is a function of the minority carrier lifetime in the high purity silicon. Carrier lifetime is degraded by the natural proton environment in space and by the neutron radiation from a high-altitude nuclear burst. A PIN diode leakage assessment has been performed.

At the bottom of the schematic of FIG. 6 is the bias voltage which is typically about 200 volts. At the top of the schematic is the ground potential. At the center of the schematic, a field effect transistors 83 which represents the conduction path between adjacent PIN diodes has the gate, 73 which is also the field plate 73, of FIG. 5 connected to the bias voltage potential. One of the source and drain terminals of field effect transistors 83 is connected to the cathode of a PIN diode 85, while the other of the source and drain of field effect transistors 83 is connected to the cathode of a different adjacent PIN diode 85.

The cathodes of the PIN diodes 85 are also connected to the high bias voltage potential. The anode of the PIN diodes 85 is connected to one end of a resistor 87 and to one end of coupling capacitor 81. The other end of resistor 87 is connected to ground potential. The other end of capacitor 81 is the signal output for PIN diode detector 85.

This approach allows use of this detector with a near-term neutral particle beam system as well as a long term system operating at increased ranges. Such long term systems, with enhanced neutral beam current can operate at up to 3,000 km ranges.

The detection threshold energy is set to approximately 5 MeV by the inherent threshold of the inelastic neutron cross section to produce protons and alpha particles in the 28 atomic weight isotope of silicon, which is 92% of natural silicon. Above the 5 MeV level, this invention provides capability of an electronically adjustable threshold. The electronic threshold is set by a comparator circuit in the analog chip. This circuit, 111 in FIG. 7, compares the incoming signal with an internal reference voltage, 113. The internal reference voltage is adjustable by varying the semiconductor elements. The reference voltage could also be controlled from an external source. Signals above the threshold value are amplified linearly by element 111. Since values above this threshold are digitized by the analog to digital converter, item 117, an additional threshold criteria may be established in the data processing by a central processor (not treated here).

THEORY OF OPERATION

Figure 11:
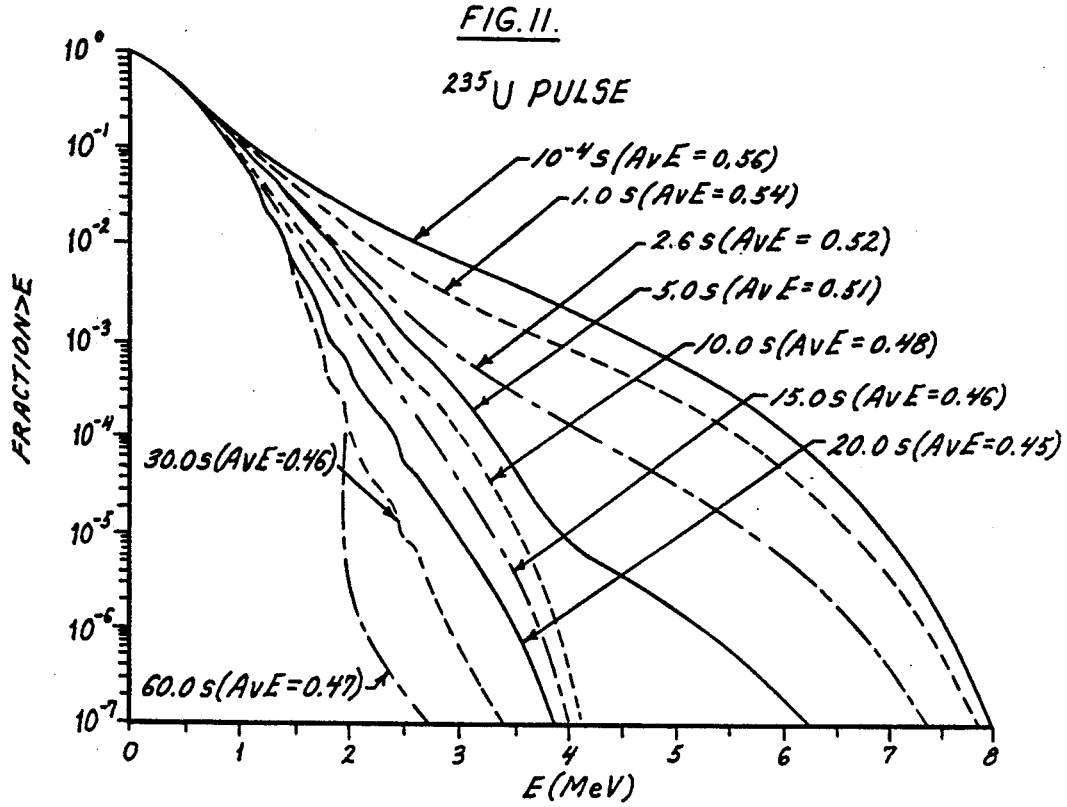
FIG. 11 shows the fraction of late-time (delayed) neutrons of various energies at different times after a nuclear pulse. This is the largest component of the neutron background, the detector must work against in processing the signal; and, FIG. 12 provides the depletion length of Silicon of various resistivity vs voltage.

Ideally, for detection of neutrons in a space environment, an 8 MeV neutron signal was decided to be preferred because there is essentially no late-time neutrons caused by the nuclear bursts. This is a well known property of the nuclear physics of fission reactions, and shown in FIG. 11. If the neutron signal threshold is set in the detector at 8 million electron volts, or 8 MeV, there will be no appreciably waiting time after the nuclear detonative when one can not make a target identification. The neutron signal will contain energies of all values. The number decreases as the energy increase. So, by using 8.5 MeV as the threshold one gets maximum signal without allowing the high nuclear background from competing with no waiting time. This detector is designed to have an adjustable neutron energy level so as to increase the target signal neutron available, but one must allow waiting time after a nuclear burst to make the target discrimination. For example, one second for a 7.8 MeV threshold, 2.5 seconds for a 7.5 MeV threshold, 5 seconds for a 6.1 MeV threshold, etc.

Ideally, for the detection of neutrons in a space environment, an 8 MeV neutron should provide a 5 millivolt signal at the detector to obtain a reasonable signal-to-noise margin for the signal processing electronics. Signals much less than 5 millivolts would require sophisticated signal processing electronics.

The invention herein uses the PIN diode 85 as the basic detection element, as discussed previously, especially FIG. 5. A PIN diode structure is similar to a normal diode composed of P and N types silicon except that an intrinsic (I) layer is sandwiched between the P and N regions, this is the term PIN. The intrinsic layer consists of high purity undoped, silicon. The intrinsic layer has the property of maintaining an electric field across it with relatively low applied voltages. The distance across the intrinsic layer that the electric field is maintained is called the depletion depth. The electric field is the necessary property to collect charges produced from the ionization of neutron interaction in the dectector.

The capture of an 8 MeV neutron produces a 6.1 millivolt signal as shown in the following calculation:

In silicon, 3.6 eV is required to generate one electron-hole (e-h) pair. The electron-hole pair are acted upon the applied electric field in the diode intrinsic layer to move the electron to the cathode and the holes to the anode. For each electron-hole pair $1.6 \times 10^{-19}$ coulombs is collected. This change results in a change in the voltage across the PIN diode 85 and therefore also across the sense resistor.

$$\Delta V = Q/C \qquad (1)$$

where $\Delta V$ = signal (charge in diode voltage)
$\Delta Q$ = charge collected due to neutron capture
C = PIN diode capacitance (58 picofarads)

$$Q = \left( E_n/3.6 \frac{ev}{\text{e-h pair}} \right) \times 1.6 \times 10^{-19} \frac{\text{coulombs}}{\text{e-h pair}} \qquad (2)$$

where En = Energy of the captured neutron in electron volts, or eV
therefore $$V = \frac{En}{c} \times \frac{1.6 \times 10 - 19}{3.6} \text{ volts} \qquad (3)$$

For $En = 8 \times 10^6$ eV;
V = 6.1 millivolts

The determination of the cell capacitance (C) is based on the need to have as small a capacitance as possible to increase the neutron capture signal. However, as the cell capacitance decreases, the number of cells per slice increases. An increase in cell quantity requires an increase in the number of processing channels in the analog and digital chips. It was determined that 16 channels was a reasonable upper limit for the analog chip. The number of diodes that could be incorporated on a wafer depends on the wafter size. Currently, high resistivity wafers are obtainable in 10 centimeter diameters. For optimum system packaging, a square slice which uses the maximum wafer area is preferred. The maximum square area obtainable from 10 cm wafer is 50 square cm. Therefore, if 16 cell are desired, each cell will be 3 square cm. The thickness of the wafer was selected to be 500 microns based on estimates of breakdown voltage limitations.

Using the equation above:

$$C = \frac{K\epsilon_o A}{d} = \frac{11 \times 8.85 \times 10 - 14 \times 3}{5 \times 10^{-12}} \text{ Farads} \quad (4)$$

C = 58 picofarads

Here, K is the relative permitivity of silicon, $E_o$ is the permitivity of free space, A is the cell area and d is the thickness of the wafer.

Next, the type of silicon, namely negatively doped, n, or positively doped, p, is chosen. The n type silicon is obtainable with resistivities above 1000 ohm-cm due to the additional refinement processing steps required to achieve the very low impurities level.

Since the detector will be exposed to incoming radiation, it is necessary to mitigate the effects of trapped charges in the dielectric (oxide) between adjacent diodes. The trapped charges could cause conduction between diodes, resulting in loss of detection signal amplitude.

N type silicon was chosen as the starting, material for the slice since the trapped charges, in the oxides would be in the direction of reducing (rather than increasing) the conductivity between adjacent diodes.

Figure 12:
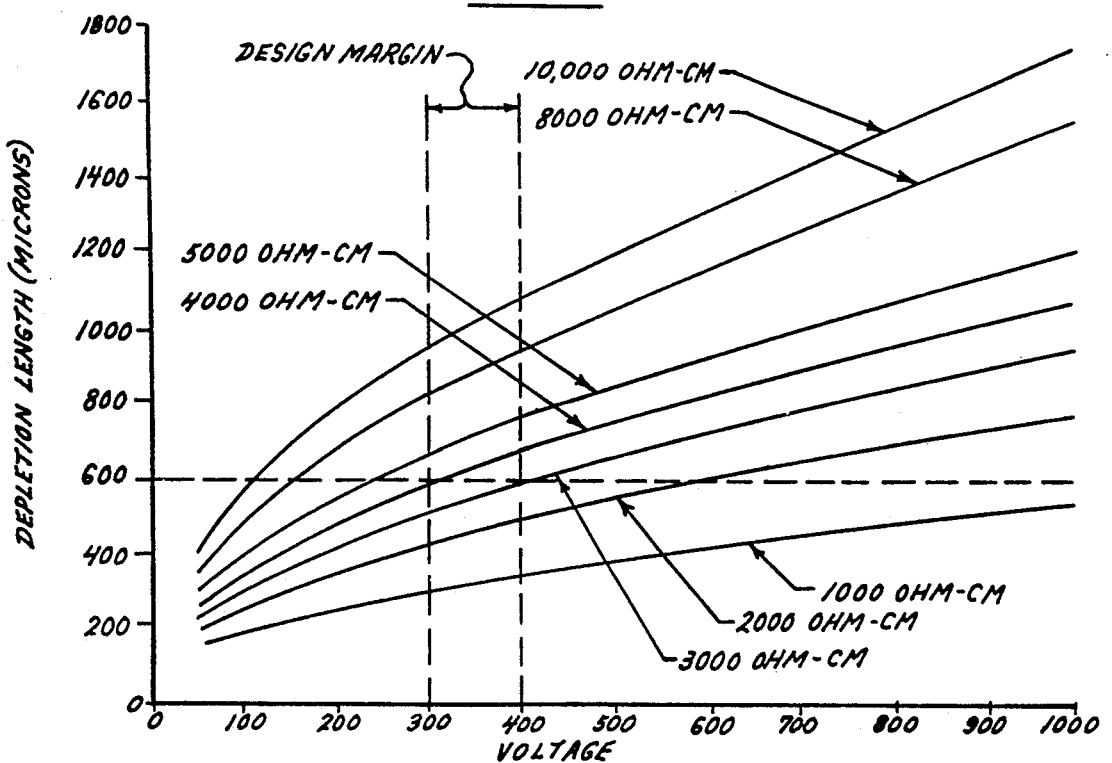

The selection of the optimum silicon resistivity for the detector implementation is based on the need to keep the resistivity as low as possible to minimize the cost of the silicon wafers. However, use of lower resistivity wafers requires thinner, and therefore, more wafers. The processing cost of these additional wafers outweighs the cost savings. FIG. 12 shows the selection constraints. The depletion length must be equal or greater than the slice thickness and the voltage required to achieve total slice depletion must be less than 400 volts. Wafers with 3000 to 4000 ohm-cm resistivities satisfy these criteria. Resistivity of 4000 ohm-cm was selected because it provides design margin and the potential of increasing the wafer thickness to 600 microns in the event that a detailed cost analysis justifies it.

The operation of a PIN diode is based upon the relationship between the depletion layer thickness (d) and the applied voltage (v) for a one-sided semiconductor step junction. The formula for the depletion layer thickness impurity concentration and capacitance are as follows:

$$d = \left( \frac{2 K \epsilon_o V}{q N_A} \right)^{\frac{1}{2}} \quad (5)$$

where K = Relative dielectric constant for silicon = 1
$\epsilon_o$ = Permittivity of free space = $8.854 \times 10^{-14}$ Farads/cm
d = depletion layer thickness,
q = Electron charge = $1.6 \times 10^{-19}$ Coulombs
$N_A$ = Acceptor impurity concentration, particles/cm$^3$ the impurity concentration ($N_A$) is given by $$N_A = \frac{1}{pq\, U_n} \quad (6)$$

where $_n$ = Carrier mobility
q = Electron charge = $1.6 \times 10^{-19}$ Coulombs
p = Resistivity of the intrinsic layer
the capacitance (C) of each cell is given as before by $$C = \frac{K \epsilon_o A}{d} \quad (7)$$

where A = Cell Area, K is the relative permitivity,

Selection of the specific values of these parameters to construct optimum detector diodes requires compromises which consider technical, physical and financial contraints.

Referring to FIG. 7, a block diagram of the sensor system of the present invention is illustrated. The block diagram is divided into three main sections. Two integrated circuit chips 91 and 93, analog and digital, respectively, are provided to process the PIN diode signal and to communicate with other elements of the detector. The pin diode array section connects into the analog chip section 91. The analog chip section 91 connects into the digital chip section 93. The digital chip section 93 is connected to certain input/output functions listed at the far right hand side of FIG. 7.

Beginning with the pin diode array section, the cathode of a pin diode 85 is connected to a positive bias potential. The anode of pin diode 85 is connected to one end of a resistor 87. The other end of resistor 87 is connected to a ground potential. The anode of pin diode 85 is also connected to one end of a coupling capacitor 81. The other end of coupling capacitor 81 traverses the boundary from the pin diode array section onto the analog chip section 91, and is connected to the cathode of a diode 107 and to the anode of a diode 109. The anode of diode 107 is connected to ground potential. The cathode of diode 109 is connected to a controlled voltage source VCC. The other end of coupling capacitor 81 is also connected into the input of an operational amplifier 111.

Operational amplifier 111 is one of several operational amplifiers located upon the analog chip portion of the diagram. FIG. 7 illustrates the existence of sixteen such operational amplifiers 111, each operational amplifier serving one pin diode array. Operational amplifier 111 is shown as the sixteenth operational amplifier in an array of sixteen. Operational amplifier 111, as well as other operational amplifiers in the array has an enabling trigger connected to a threshold block 113. Operational amplifier 111 has an output, as does the other operational amplifiers in the array, each connected to a separate input of a multiplexer 115.

The output of multiplexer 115 is connected to the input of an analog to digital converter 117. Analog to digital converter 117 is connected across the analog chip boundary and onto the digital chip area 93. The output of analog to digital converter 117 is connected to the input of a register 119. The output of register 119 is connected to an input/output controller 121. Input/output controller 121 is connected to an event encoder 123. Event encoder 123 is in turn connected across the digital chip area boundary to both the analog to digital converter 117 and to the outputs of the operational amplifiers 111.

Input/output controller 121 has utility connections including a clock, a redundant input data line and a redundant output data line. Once a neutron triggers PIN diode 85, an input signal whose amplitude is proportional to the neutron energy is generated by the PIN diodes 85. As shown, the input can be generated by any of the 16 PIN diodes 85 with each diode driving a separate analog channel, here shown to be any one of sixteen channels. When coupling capacitor 85 experiences a voltage potential change, diodes 107 and 109 limit turn on and nuclear burst transients and prevent damage to operational amplifier 111.

Operational amplifier 111 is enabled to amplify signals greater than that set by the threshold control 113. Operational amplifier 111 will ideally have a gain of about 36 dB and will amplify the signal for both the event encoder 123 and the analog to digital converter 117. The amplified signal enters the event encoder 123 and causes it to latch. The latched output is then sent through input/output control 121, to be read by the digital system. This input/output control 121 is dynamically biased to reduce power.

The outputs of the operational amplifiers 111 are also the inputs to a sixteen-to-one multiplexer 115. multiplexer 115 is fully differential for noise immunity. The output of the multiplexer 115 drives the four bit analog to digital converter 117. When a minimum signal event above the offset voltage (5 mV) is detected, the output is enabled to the analog to digital converter 117.

Ideally, analog to digital converter 117 is a flash type converter for fast conversion response. The voltage range for analog to digital converter 117 is temperature compensated to track the amplifier temperature characteristics and maintain a ½ least significant bit linearity. The A/D converter is monotonic by design. In addition, analog to digital converter 117 has a front-end stage that converts the signal amplified by operational amplifier 111 into a single ended signal. The system of the present invention is laid out with an 80–85% utilization of the bipolar PIN diode array.

Once enabled, operational amplifier 111 amplifies the voltage change through to multiplexer 115. The voltage is then multiplexed and converted to a digital signal by analog to digital converter 117 for storage in register 119. The total information in register 119 is made available to input/output control 121 for use in evaluating the characteristics of the particles sensed.

Generally, the analog chip amplifies the PIN diode signal and digitizes signals above a predetermined charged particle threshold, from threshold control 113, and is nominally set at 6 MeV. This threshold value is set by the desired neutron energy level minus the endothermic neutron reaction value.

The digital integrated circuit, or chip section of FIG. 7 has two main functions in the neutron detector system. First, reliable capture events presented by the analog chip section 91 create a "descriptor word" for each event. Second, the digital chip section 93 can scan and update each processor message and add event descriptions to the message.

The message processing function is an integral part of the system timing. The main clock for the digital chip section, shown at the right side of FIG. 7, is a 4 MHz, 50% duty cycle square wave. The processor (not shown) provides this signal to all slices in the brick and is referred to as the "system clock". It is assumed that a clock tree network will be used to minimize the system clock skew between slices so that the slice timing will by synchronized.

For example, if the processor message rate is at 1 MHz, four clock signals transpire for every bit time. The 1 MHz message clock is generated in the digital chip of FIG. 7 by simply dividing the clock signal by four. When a slice is initialized, the processor (not shown) synchronizes the 1 MHz clock to the proper phase of the 4 MHz clock signal. When several slices are connected together, each has its internal 1 MHz clock synchronized to the same relative 4 MHz clock period. Therefore, a message bit which originates from the processor, would require 285 1-MHz clock periods to traverse a full brick configuration and return to the processor.

The internal 1 MHz clock is used by each slice to determine the beginning of each message bit time. Once the processor has initialized all the slices, it places serial data on the first Slice 21's input channels just before a rising edge of the clock signal. The processor knows to which clock signal period the first Slice 21 is synchronized. The first slice 21 then processes the bit during the next four clock periods, then sends it to the second slice 21, which processes it and sends it to the third slice 21.

The processor message has a fixed format. The "preamble" and "header" are fixed 10-bit fields that are passed through the slice unchanged. The preamble is a unique code ('1011100101' binary) that identifies the start of a message, while the header contains special test mode bits. The next 10-bit field, "slice ID", represents the ID number of the preceding slice, and is identified by its position relative to the processor rather than a hard-wired code on each IC. The next 10-bit field, "word count", tells how many descriptor words follow in the message stream. Each word contains the 10-bit slice ID of the slice that added the descriptor, the 16-bit relative time value the strike occurred at, the 4-bit energy magnitude of the strike, the 6-bit address of the PIN diode that received the strike, and a parity bit for a total of 37 bits.

Just before receiving the word count field, the slice determines how many event descriptors it will append to the message. Up to three descriptors can be stored internally. As the word count field passes through, it is incremented by the number of descriptors to be added. The existing 37-bit descriptors are passed through unchanged, then the locally held descriptors are appended to the message stream. Thus, the length of a message can always be determined by the formula:

$$\text{message length (in bits)} = [\text{word count} \times 37] + 40. \quad (8)$$

The overall message structure as it passes from the processor, through all 285 slices, and back to the processor should now be clear. Initially, the processor sends a 40-bit message (i.e., one with no dscriptor words) to Slice #1. The slice ID and word count fields are both zero. Since each slice sends only '0's along the chain when no message is passing through, the processor simply monitors the outputs from Slice #285 and waits for nonzero values to show up. These values should be the start of the preamble, delayed by 285 ms from the time it entered Slice #1. As the processor reads this message, it should see the value 285 in the slice ID field, followed by a word count field containing the total number of event descriptors from all 285 slices during that message pass. As the descriptors are read, the "descriptor slice ID" subfields should always stay the same or increase but never decrease.

The process just described assumes that one or more event descriptors are present in some of the slices in a brick. Actually, this may or may not be true. The typical neutron event should come widely separated in time from other events, and it would be rare for a slice to hold more than one descriptor at once. In a working system, the great majority message passes would contain zero descriptors.

The stacking of several hundred silicon slices 21 of FIG. 4 into a single "brick" 13 of FIG. 2 is facilitated by the unique interconnect scheme shown in FIG. 8. The connection configuration of a stack of a small number of slices 21 is shown to illustrate the manner of connecting the slice inputs and outputs to a point off chip. A stack of nine slices 21 are shown. Also illustrated are the circuit areas 31 and 33, the detectors 23, and notch 35. The signal processing chips and are mounted upon areas 31 and 33 of FIG. 8 on a corner of the slice 21. A notch 35 has been provided to provide clearance for the chips on the adjacent slice. A redundant set of slice interconnect lines are provided to reduce the slice edge connection configuration to three, as shown by the connection duplication shown on FIG. 8.

Written vertically below the stack of nine slices 31 are the identities of the signals carried upon the edge metallization. The metalization areas marked bias, clock, signal, and power are all vertically continuously connected and have the same vertical potential within each category. However, the wafer input and output labeled wafer I/O are not vertically continuous. The alternate location of circuit areas 31 and 33 facilitates the spatial separation of the edge metallization relating to the wafer I/O. The utility connection to the bias, clock, signal, and power can occur at any point in a vertical line, or vertically continuously. It is clear, however, that the wafer I/O connection must be configured to exactly match the edge metallization relating to the I/O function.

FIG. 9 illustrates the packing and utility connector structures which facilitates the electronic access to, organization and handling of slices 21 to form a detector structure. A rectangular housing 201 has rigidly attached top and bottom, and has three rigid sides. This phone booth shaped structure will stackably support a finite number of slices 21. Only about four slices 21 are shown on the bottom of housing 201 to illustrate the general orientation of the stack which would be supported in housing 201.

Housing 201 has an elastomeric connector 203 which acts as a cover and sealably fittable over the open side of housing 201. The side of elastomeric connector 203 which will abut the metalized portion of the stack of slices 21 within housing 201 has a metalized portion to match the metalized portions of the stack of slices 21 illustrated in FIG. 8. Note that the wafer I/O metallization on the inside of elastomeric connector 203 is intermittent as is the wafer I/O metallization on the stack of slices 21 of FIG. 8. Note that the bias, clock, signal, and power connections are vertically continuous, to match the continuity of those utility connections on the stack of slices 21 of FIG. 8.

Once housing 201 is filled with stackable slices 21, elastomeric connector 203 is attached to form a shock resistant "brick" 13 as was shown in FIG. 2. The metallization on the inside of elastomeric connector 203 can be extended elsewhere via any connection to the bottom of housing 201 (not shown).

The primary packaging emphasis is to minimize the volume required by the structural components and reduce the processing and assembly costs. A benefit of alternating the slice 21 orientation is that the high voltage sides are facing each other and stacked and aligned in the aluminum housing 201. A compression force of approximately 100 lb maintains the slices 21 in position. This pressure will provide adequate margins against breakage. The cover of the housing 201 holds an elastomeric connector 203 against the slice 21 edge metallization. Connection may also be provided to the local processing mounted below the housing 201 (not shown).

Ideally, the bricks 13 formed by housing 201 can be combined in any geometry to form a detector. In FIG. 10, the bricks 13 are formed into a grid pattern on a tray shaped support structure. This structure will enable the general geometric structuring illustrated in FIG. 2. A pair of end walls 211 are shown to horizontally support the grid layout of bricks 13. End walls 211 and back wall 213 are typically made of a hydrocarbon neutron shield on five sides since the upward facing surfaces are not exposed to albedo neutrons. The tray of bricks 13 shown in FIG. 10 is thereby not only supported, but shielded from unwanted detection on 5 of the six sides of the structure.

An electronics area 215 is provided in back wall 213 to enable the controlling electronics for the detector to be more locally located. Local placement of the controlling electronics will help minimize interference problems. In addition, a high Z shield 217, about 100 mils thick is provided to encapsulate the entire array of bricks 23 on six sides. In FIG. 10, the shield 217, typically of high atomic number, is illustrated adjacent the back wall 213 material.

Also shown is a layer of interconnect board 219. The methods of interconnecting bricks 13 to the controlling electronics are many. In most instances this will be accomplished by some form of electrical conduit embedded within a board 219 (not shown). Note that only one corner of the tray-like geometry is shown. Completion of this view would form the geometry illustrated in FIG. 1.

PHYSICS OF THE DETECTION ENVIRONMENT

The ability of the neutral particle beam system to deposit energy into targets, causing damage and secondary emissions, is well known. Application of such beams for target discrimination has been recognized by various Strategic Defense Initiative architecture studies and the Strategic Defense Initiative Interactive Discrimination Study. Details of the nature and quantity of the secondary emissions induced by the neutral particle beam are currently being investigated both experimentally and analytically. Data gathered to date are still somewhat incomplete and inappropriate for most efficient use in system design. The detector of the present invention will enable rapid and complete formulation of such a data base, as well as subsequent use of the data base with the detector for target discrimination.

In a benign environment, the neutron and gamma ray observables both are very effective in providing a basis for discrimination. However, in the presence of offensive nuclear bursts set off to counteract the midcourse discrimination process, or defensive bursts, the neutron observable is more resilient than the gamma-ray observable. High-altitude nuclear signals produced by nuclear bursts cause a huge number of late-time gamma rays and neutrons which constitute a very formidable background within which to perform the discrimination process. In this event, the use of gamma rays is not feasible because it is impossible to separate the gamma rays emanating from the target from the much larger number of late-time gamma rays caused by the nuclear bursts.

Under these conditions, the use of the neutron signal for discrimination is possible if a new neutron detector is designed to be immune to the high late-time gamma rays and neutrons. Since the late-time neutrons all have an energy of less than about 8.5 MeV, only a neutron signal above this threshold energy can be used.

The neutron observable is the leading candidate for Strategic Defense Initiative discrimination application as identified by a functional model based upon a nucleon-gas statistical model. This model includes stratification of beam-energy values into the capture material as the beam slows down. This information permits the stratification principle to be applied to situations where the incident beam energy is not so high that the beam exit energy is substantially the same as the entrance value.

The neutral particle beam's ability to serve as the basis for a robust interactive discrimination process by providing target mass measurements in the exoatmosphere is dependent on the existence of a neutron detector capable of operating in a severe nuclear-burst environment. This very large environment arises in offensive force threat definition scenarios and represents the offensive force's ability to detonate a 1-megaton, fission-rich, nuclear bomb every 1000 km, every second during the attack to prevent midcourse discrimination. A nuclear detector operable in this environment would defeat this countermeasure and support midcourse kill vehicles, or kill by the neutral particle beam itself. The detector of the present invention meets this criteria, unlike any detector presently available.

The ability to perform this discrimination function is dependent on the creation and the subsequent availability of a neutron detector capable of functioning in the presence of background sources. These background sources include the extremely large late-time environment of neutrons and gamma rays arising from the advertent or inadvertent nuclear bursts present within the high altitude nuclear signals environment. In addition, the Earth's albedo neutrons produced by the high-energy particle interactions with the atmosphere below the midcourse discrimination altitudes, and the particles produced in the detector itself by cosmic-ray interactions, are interfering sources of neutrons.

The estimated weight of a detector with an effective area of 4.5 m$^2$ is about 5 metric tons and the detector efficiency is about 45%. The cost of the detector array is estimated at $10–20 million. For a pop-up, rapid deployment system much smaller detector sizes and costs are possible using the high altitude nuclear signals-immune design concept.

The detector efficiency is quoted as 45%. This is based on detector thickness of 14 cm. Thinner detectors would have lower efficiency and thicker ones more efficiency. The efficiency is given approximately by $$Eff = (1 - e^{-(ab(D\pi)/2)})_r \qquad (9)$$

where Eff is the efficiency, D is the physical thickness (in cm) and ab is the linear absorptive coefficient of neutrons of energies 8.5 to 12 MeV being transmitted to protons and/or alpha particles by neutron inter action with silicon isotope 28. The total crossection of 600 millibarns for neutron-proton and neutron-alpha reactions in this energy regime and the density of Silicon=2.4 gm/cm$^2$ makes $=3.1(10^{-2})$ cm$^{-1}$, r is the ratio of the Silicon isotope 28 to total isotopes of Silicon=0.922. The following table shows how the efficiency varies with thickness D.

TABLE I

| Efficiency as a function of Detector Thickness | |
|---|---|
| D (cm) | N |
| 0 | 0 |
| 5 | .20 |
| 10 | .36 |
| 14 | .45 |
| 20 | .57 |
| 25 | .65 |
| 30 | .71 |
| 40 | .79 |
| 50 | .84 |

The thickness 14 cm is a good design point, trading efficiency as a function of thickness. The patent does not rely on any particular thickness chosen.

Cost of the operational detector will be essentially proportional to the number of slices contained. Availability of 20-cm diameter float-zone processed wafers would significantly reduce the detector cost. The largest size presently available is about 12.5 cm.

The detector must operate after exposure to X-rays, gamma rays, and neutrons from nuclear bursts and from the natural space environment. Circuit processing and physical designs are specifically intended to assure performance in this environment.

In order to discriminate reentry vehicles from decoys with a discrimination K factor of three or more, which translates into an occurrence of less than 1% false targeting on decoys and leakage of reentry vehicles. one must be capable of observing 25 to 35 neutrons above the 8.5 MeV energy threshold. The energy threshold is required to make the detector immune to the extremely large, late-time delayed neutron and gamma environment which is generated by nuclear bursts. The actual neutron number required depends on the high fidelity of the replica decoy design in terms of neutron production and the size of any residual background environment not discernable from the target signal provided the signal/background ratio is greater than $\frac{1}{4}$. The discrimination is feasible with a reasonable number of neutrons.

For smaller signal/background ratios the signal must be too large to be of practical use since it would entail a very large detector at ranges of 500 to 2000 km. These ranges are required to have an affordable number of detector platforms in the neutral particle beam-detector constellations and cover an attack.

A detector of effective area, effective meaning its efficiency times its area, of about 4.5 m$^2$ has been identified as a good design point. This size allows use with near-term neutral particle system as well as long-term systems operating at increased ranges.

The neutrons counted by a detector of efficiency and frontal face crossection area A$_D$ in cm$^2$ is given by $$\text{neutrons} = \frac{I\, t(1 - e^{-(At/2\pi s\, R_T^2)})\, A_D Y\, \text{Eff}}{q\, 2\, R_D^2} \quad (10)$$

where I is the neutral beam current in amperes, q is the charge of an electron$=1.6\times10^{-19}$ coulomb, t is the dwell time of the beam on target, $A_T$ is the projected area of the target (cm$^2$), s is the beam divergence in radians, $R_T$ is the distance from the target from the neutral particle beam in cm, $R_D$ is the distance from the target to the detector in cm, and Y is the number of neutron is the energy range being counted by the detector per incident NPB particle, and Eff is the detector efficiency from equation (9) above.

Using decision theory, about 25 counts are needed to obtain a target discrimination that is 95% correct, and 35 counts 99% correct for a background level equal to the signal level. The yield values Y are given in Table I for various neutron energies. These results are calculated from the standard Fermi theory of evaporation neutrons (reference—E. Fermi—Nuclear Physics, University of Chicago Press, 1949, pages 159–164.)

TABLE I

| Energy | Neutron Yield per Incident Particle | | |
|---|---|---|---|
| | 150 MeV | 200 MeV | 250 |
| Y(8.5–12) MeV Hydrogen Beam | .006 | .008 | .009 |
| Y(6–12) MeV Hydrogen Beam | .013 | .016 | .020 |
| Y(8.5–12) MeV Deuteron Beam | .005 | .011 | .016 |
| Y(6–12) MeV Deuteron Beam | .010 | .018 | .042 |

By not counting events with an energy higher than 12 MeV, the background (i.e. those counts not due to the beam induced neutron signal such as albedo and cosmic ray induced events) is reduced. Then the beam induced signal may be utilized against the residual (albedo and cosmic ray induced) background in the 8.5–12.0 MeV range. The evaporation target signal neutron flux in the 8.5–12.0 MeV regime is $\leq 8\times10^{-3}$ neutrons/cm$^2$/sec. The albedo neutrons are about 2.5 times more intense in the same energy regime, and the cosmic-ray generated neutrons produced in the detector itself are 4 to 16 times higher.

Accordingly, the detector of the present invention is immune to the high high altitude nuclear signals n, gamma ray environment, is able to discern the cosmic-ray induced events and not count them and, can reduce the albedo neutrons to obtain a S/B, signal to background ratio of $\geq 1$ so that a detector of reasonable size can accomplish the discrimination. The reasonable size, hence weight dictates the high efficiency of the detector. Although the neutron detector will usually not detect the presence of prompt radiation, it must survive the cumulative effects of the multiple bursts. Consequently, the detector is nonoperative for about 100 milliseconds after each nuclear burst. Further, the detector will not degrade in performance due to the up to 10 year long residence time in the low-level natural environments as it orbits the Earth over all latitudes before potential use in the high latitude battlespace. . The physical basis of the detector design was dictated by investigations which indicated that the best concept to accomplish the above requirements is a silicon detector System using the neutron-proton and neutron-alpha inelastic transmutation reactions of neutrons in the Silicon isotope of atomic mass 28. The neutron energy is determined from the charge deposition in detector cells with dimensions large enough (500 um) to contain the full range of proton and alpha particles produced in the endothermal reactions of fairly large cross-sections about 300 millibarns each. A millibarn is one one thousandth of a barn. A barn is a measure of a neutron's cross section. A barn is equivalent to $10^{-24}$ square centimeters. The energy threshold rejection is produced by circuit design wherein events of too low a charge deposition do not stimulate the detector. This thresholding is essential in order to make the detector immune to the high late-time high altitude nuclear signals environment. Measuring each of the high number high altitude nuclear signals events and then discerning their characteristics would be impossible since it would overload the on chip electronics capability.

The detector was designed to not respond below the energy threshold. The events must be measured in less than 1 microsecond to avoid several late-time neutrons of energies below the threshold energy, interacting in a single-cell, to appear to the detector like one target neutron having an energy of 8.5 MeV. The electronic implementation can provide up to a 600 nanosecond time constant. The false counting rate when measuring 35 target neutrons is only 0.005 high altitude nuclear signals per induced event, an acceptable low number. The high altitude nuclear signals gamma-ray environment is not able to generate any significant number of false counts due to the energy thresholding feature, and because the charge deposition is spread over many cells due to the large range of the secondary electrons. The false count due to overlapping of many gamma ray interactions is negligible, ocurring much less than one time in $10^{-6}$.

The cosmic-ray-induced events are detected in more than one cell, registering above threshold charge in a short time interval because of the multineutron, proton, alpha particles yield of high-energy cosmic-ray components interacting in the large detector. In the discrimination process of 0.1 seconds, $4\times10^5$ discernable time intervals, 35 intervals have target neutrons and less than 600 have cosmic-ray events. The cosmic-ray events are rejected by a time coincidence and/or an over-range energy criteria of greater than about 12 MeV. Less than 0.1 target neutrons would be lost due to a chance coincidence with a cosmic-ray event.

The albedo-neutron environment presents a neutron background component having energy of about 8.5 to 12 MeV which competes with the desired target evaporation neutron signal. To handle this environment we make use of the fact that the atmospheric originating environment is coming only from the bottom side of the platform lying outside the earth's atmosphere. Referring back to FIG. 10, the underside of the detector is covered with a neutron shield 213, typically made of hydrocarbon. The detector operates in an upward looking mode to the target. The hydrogen collisions scatter the neutrons and degrade the energy sufficiently while the carbon mainly scatters the neutrons. The scattering makes the effective thickness larger. A mass thickness of about 8.4 gm/cm$^2$ will lower the albedo environment in the measured energy interval, by a factor of about 0.36 or to just about the same magnitude of the reentry vehicle target neutron flux. This situation allows for discrimination at tactical interesting ranges and dwell times of about 0.1 sec.

A thin 100 mil (100 thousand of an inch) high Z shield 217, made of a material such as lead, is provided over the detector faces to protect the silicon cells from the effects of the large prompt X-ray and low-energy gamma ray doses. High Z materials are denser materials having higher atomic numbers such as lead. The silicon cells and the supporting electronics must survive both the prompt radiation and the cumulative effects of natural Earth environments for 10 years to make the system cost effective. Radiation effects have been examined to check that the design concept is feasible. However, a detailed analysis and radiation test should be conducted in the future on the cell and electronics design to establish detailed and reliable dose versus performance degradation values.

The total weight of the detector system using the number of slices and orientation described in the figures is about 5 metric tons, of which the 45% efficient 10 $m^2 \times 14.5$-cm thick silicon cell array is 3.4 tons, the hydrocarbon moderator is 1 metric ton and the high Z shield is about 0.6 metric tons. It is estimated the total detector system will be 7 metric tons. A major reason for the light weight of this detector is the dual use of silicon in providing a high efficiency neutron detector by its high-reaction cross section in the evaporation neutron energy range, and in providing the semiconductor properties for the charge counting.

Additional structures are incorporated on the wafer to complete the event sensor design. These additional structures include the use of a fusible sense resistor in the position of resistor 103 of FIG. 8. The fusible sense resistor becomes a safety valve for the exponential signal signature. The resistor will fuse open in the event that a PIN diode is shorted due to defects in the wafer. Therefore, shorted PIN diodes will not consume excessive power or interfere with adjacent cell operation. Signal coupling capacitors are provided which can withstand the high two hundred volt PIN diode bias. In addition, a field plate isolates each diode and prevent leakage and signal cross-coupling.

Built-in-test capability is incorporable into the design which exercises all of the digital and some of the analog circuitry. The partitioning of the detector functions is shown in FIG. 8. Typically, all signal processing can be performed at the slice 31 level. The event signal processing is very fast and can be completed within 600 ns. This approach sharply reduces the amount of data which would otherwise need to be processed by a central processor for the neutron events in the range of interest. The computational load on the central processor is very low since less than 100 events are evaluated in the 0.1 seconds of the discrimination process.

A preliminary estimate of the slice cost for very large quantities has been made to determine the significant cost drivers. The most significant cost item is the wafer processing. Processing the PIN diodes requires about 6 masks and 12 process steps, a process which is about half as complex as CMOS.

In addition, circuit elements are extremely large when compared to micron feature size of CMOS. Therefore, alignments and defects are much less critical, resulting in higher manufacturing yields.

The prototype processing estimate is based upon long diffusion times. Process optimization in steady state manufacture can reduce the cost by 50%. Slice cost may be reduced by using 8-in. wafers since the processing cost is based on time and not wafer size. Five inch float-zone wafers are commercially available.

The size of the PIN diode cell is a function of the desired signal level and background noise response. The noise response is controlled by the time constant of the PIN diode signal. This time constant is ideally set at about 600 ns. The time constant could be further reduced to 300 ns. The reduction in time constant allows for an increase in cell size. By increasing the thickness of the wafer, less wafers would have to be processed. A factor of 2 increase in thickness, limited by the depletion voltage, is possible.

The analog design is implementable upon a single-layer metal programmable bipolar array that is manufactured by STC Components in England. The design, as was illustrated in FIG. 8, consists of several major blocks including operational amplifiers 111, threshold control 113, analog/digital converter 117, and associated support apparatus.

The actual process of capturing an event from the PIN diodes is performed by the analog IC. The low-level voltage pulse seen when a neutron event occurs is amplified, then digitized into a 4-bit value. The analog IC sends two pieces of information to the digital IC: (1) the number of the channel that saw the strike, and (2) its 4-bit energy value.

The analog IC sends 16 signals to the digital chip, one for each PIN diode detector. These signals are normally a logic '1'. When no strike has occurred, all 16 are '1'; only when a strike is detected will one of the lines go to '0'. The digital IC is constantly monitoring the 16 detector lines, and logically ORs them together internally. It is assumed that only one detector signal will ever be active (i.e., '0') at one time. System timing dictates that the 4-bit energy value will be stable a maximum of 850 nanoseconds from the time one of the detector lines goes low. At this time, a 4-bit encoded detector address, the 4-bit energy value, and the 16-bit time tag latched into word #1 of the FIFO, first in first out logic, forming a complete "event descriptor".

Throughout this operation, the analog IC holds stable the 16 detector lines and 4-bit energy value in an internal latch. Just after the event descriptor is latched into the IC's FIFO, the "event complete" line is asserted to signal the analog IC to reset its latches. Once the digital chip sees that all 16 detector signals are again '1', it can accept another event. This interlock protocol assures that a single event cannot generate more than one descriptor.

The time tag portion of the descriptor word is a 16-bit value that is incremented on every SCLK (set clock signal) rising edge. Thus, it has a maximum time period of $[2^{16} \times 250$ nanoseconds$] = 16.4$ milliseconds before rolling over. The timer is free-running at all times, and is reset just after a valid preamble is received. After a message pass, the processor can determine the absolute times for all events since it can compute when each slice saw the valid preamble on the previous pass, then add the offset from the time tag field of each descriptor word. It should be noted that the descriptor word is latched into the FIFO on the falling edge of SCLK, so the time tag is guaranteed to be stable.

The foregoing disclosure and description of the invention are illustrative and explanatory thereof, and various changes in the mode of implementation of the geometry, and variations thereon, types of electronics used to effect detection, or order of arrangement of the different types of sensors, as well as in the details of the illustrated embodiments may be made without departing from the spirit and scope of the invention.

What is claimed is:

1. A neutron detector comprising:

a plurality of individual detector cells, each cell comprising means for capturing neutrons which produce alpha and proton emissions as a result of such capturing integrated with biased PIN diode means to collect said emissions and provide an electrical output indicative of the energy level of a neutron captured within the cell;

means to collect the electrical outputs from each of the plurality of detector cells and provide an indication of the total number of neutrons captured by the plurality of detector cells;

means to exclude the counting of neutrons below a lower energy threshold and above an upper energy threshold; and time gate means to limit the collection of the outputs to a pre-set time interval.

2. The neutron detector of claim 1 wherein the cells are formed from silicon.

3. The neutron detector of claim 1 wherein the lower energy threshold is about 8.5 Mev.

4. The neutron detector of claim 1 wherein the upper energy threshold is about 12 Mev.

5. The neutron detector of claim 1 wherein the width of the time interval is less than about 1 microsecond.

6. The neutron detector of claim 1 wherein the plurality of detector cells is covered on all surfaces except for that surface through which it is desired that neutrons enter by a neutron scattering shield means.

7. The neutron detector of claim 6 wherein the neutron scattering shield means comprises a hydrocarbon energy moderator.

8. The neutron detector of claim 1 wherein each of the cells is connected to its own fusible resistor means such that the resistor means will fuse open upon failure of the cell, thereby isolating it from the rest of the detector.

* * * * *